United States Patent [19]

Motomura

[11] Patent Number: 4,776,767
[45] Date of Patent: Oct. 11, 1988

[54] ELECTROMAGNETIC PUMP

[75] Inventor: Noriyuki Motomura, Zama, Japan

[73] Assignee: Toshiba Kikai Kabushiki Kaisha, Tokyo, Japan

[21] Appl. No.: 48,612

[22] Filed: May 11, 1987

[30] Foreign Application Priority Data

May 14, 1986 [JP] Japan .................................. 61-72462
May 20, 1986 [JP] Japan ............................. 61-75976[U]
May 28, 1986 [JP] Japan ............................. 61-80432[U]

[51] Int. Cl.$^4$ ............................................ F04B 15/04
[52] U.S. Cl. ...................................... 417/50; 310/11; 417/363
[58] Field of Search ...................... 417/50, 363; 310/11

[56] References Cited

U.S. PATENT DOCUMENTS

| | | |
|---|---|---|
| 3,150,483 | 9/1964 | Mayfield et al. ................. 310/11 X |
| 3,524,087 | 8/1970 | Dubois et al. ....................... 310/11 |
| 3,754,634 | 8/1973 | Gerbig et al. ..................... 417/50 X |
| 3,767,090 | 10/1973 | Sundberg et al. ................. 417/50 X |
| 3,885,890 | 5/1975 | Davidson ............................... 417/50 |

FOREIGN PATENT DOCUMENTS 0436423 1/1975 U.S.S.R. ................................ 417/50

OTHER PUBLICATIONS

Encyclopedia of Chemical Technology, Third Edition, 4/1978, vol. 14, p. 659.

Primary Examiner—Leonard E. Smith
Assistant Examiner—Eugene L. Szczecim, Jr.
Attorney, Agent, or Firm—Stevens, Davis, Miller & Mosher

[57] ABSTRACT

In an electromagnetic pump of the type including concentric outer and inner conduits for defining a passage for molten metal, an exciting coil surrounding the outer conduit, and a magnetic core contained in the inner conduit, a cartridge electric heater is inserted into the inner conduit for preventing temperature drop of the molten metal supplied to a casting machine, for example. The electric heater may be disposed in series with the magnetic core or may be inserted into a cylindrical magnetic core.

6 Claims, 2 Drawing Sheets

ELECTROMAGNETIC PUMP

BACKGROUND OF THE INVENTION

This invention relates to an electromagnetic pump, and more particularly to an electromagnetic pump adapted to convey molten metal.

A conventional electromagnetic pump generally comprises an outer conduit made of heat resistant material, for example ceramics, and with one end communicated with the interior of a vessel containing molten metal, an inner conduit with the inner end closed and concentrically disposed within the outer conduit for defining a passage for the molten metal, an induction or exciting coil wound about the outer conduit, and a coupling surrounded by a reinforcing ring made of iron and connected to the outer end of the outer conduit, the coupling being connected with a vertical conduit for supplying the molten metal to a casting machine, for example.

For the purpose of preventing temperature decrease of the molten metal while it flows through the magnetic pump and the vertical conduit, according to a prior art construction, at least one cartridge electric heater is inserted vertically through the iron ring. With this construction, however, as the cartridge electric heater is provided for the massive iron ring it takes a long time for reaching a desired high temperature. Moreover, as the heat dissipating area of the iron ring is large it is necessary to increase the rating of the cartridge heater.

According to another prior art electromagnetic pump, an electric heating wire is helically wound about the outer surface of the outer conduit and the exciting coil is disposed about the electric heating wire via a heat insulating cylinder. With this construction, it takes a long time and much labor to disassemble electromagnetic pump, remove the broken heating wire, mount a new heater and reassemble the electromagnetic pump. During this repair, the operation of the casting machine must be stopped, thus reducing productivity. Furthermore, it is necessary to use a thick insulating cylinder for preventing heat from being transmitted to the exciting coil.

According to another type of the electromagnetic pump, a hollow inner conduit containing a magnetic core is secured to the side wall of the vessel containing molten metal through a clamping plate which is bolted to the side wall of the vessel with nuts threaded to the bolts with compression springs interposed between the nuts and the clamping plate. With this construction, for exchanging the magnetic core, the clamping plate is removed whereby both inner and outer conduits are loosened so that care must be taken for reassembling the electromagnetic pump to prevent leakage of the molten metal.

SUMMARY OF THE INVENTION

It is an object of this invention to provide an improved electromagnetic pump wherein a cartridge electric heater is installed in a hollow inner conduit, thus simplifying exchange of the electric heater, decreasing heat dissipating surface area, and eliminating the heat insulating cylinder.

Another object of this ivnention is to provide a novel electromagnetic pump wherein the outer and inner conduits are clamped by independent clamping means, thereby enabling removal of only the inner conduit independently of the outer conduit.

According to this invention, these and further objects can be accomplished by providing an electromagnetic pump comprising an outer conduit with one end communicated with the interior of a vessel containing molten metal, an exciting coil surrounding the outer conduit, an inner conduit having a closed one end and concentrically disposed in the outer conduit for defining a passage for the molten metal between the inner and outer conduits, another conduit connected to the other end of the outer conduit through coupling means, a cartridge electric heater contained in the inner conduit for heating the molten metal flowing through the passage to the another conduit, a magnetic core contained in the inner conduit for passing magnetic flux created by the exciting coil, and a cover plate removably secured to the other end of the inner conduit or holding the cartridge electric heater and the magnetic core in the inner conduit.

According to a modification of this invention, there is provided an electromagnetic pump comprising an outer conduit having one end communicated with the interior of a vessel containing molten metal, an exciting coil surrounding the outer conduit, an inner conduit having a closed one end and concentrically disposed in the outer conduit for defining a passage for the molten metal between the inner and outer conduits, another conduit connected to the other end of the outer conduit through coupling means, a magnetic core contained in the inner conduit for passing magnetic flux created by the exciting coil, and a plurality of independent clamping means for the inner and outer conduits respectively.

DESCRIPTION OF THE PREFERRED EMBODIMENTS

Figure 1:
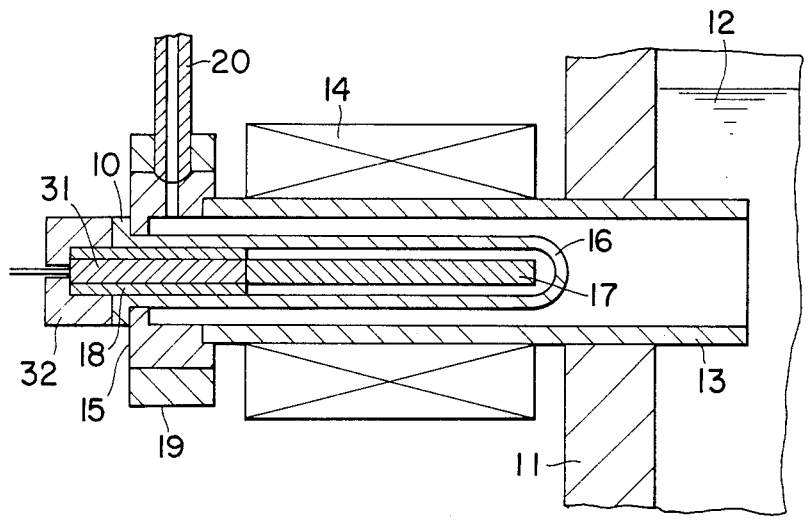
FIG. 1 is a vertical sectional view of one embodiment of the electromagnetic pump according to this invention.

The electromagnetic pump shown in FIG. 1 comprises an outer conduit 13 made of heat resistant material not corroded by molten metal 12 contained in a vessel 11, the inner end of the outer conduit 13 being opened in the vessel 11, and an inner hollow conduit 16 with its inner end closed and disposed in the outer conduit 13 concentrically therewith for defining therebetween a passage for the molten metal 12. The outer end of the outer conduit 13 is closed by a coupling 15 made of a material resistant to the molten metal and surrounded by an iron ring 19. A vertical conduit 20 is connected to the inside of the outer conduit 13 through the coupling 15 and the iron ring 19 for supplying the molten metal to a casting machine, for example. Inside of the inner conduit 16 are contained a magnetic core 17 for passing the magnetic flux generated by the exciting coil 14, a cartridge electric heater 31, and a split protective sleeve 18 made of cobalt-vanadium alloy having a Curie point of about 880° C. and interposed between the cartridge electric heater 31 and the inner surface of the inner conduit 16. The outer end of the inner conduit 16 is closed by a cover plate 32 secured to the flange 10 of the inner conduit by bolts, not shown, or the like. In this example, the magnetic core 17 and the electric heater 31 are disposed in series.

In operation, the magnetic flux induces electric current in the molten metal and the induced current reacts with the flux to create an electromotive force that moves the molten metal flux 12 toward the left as viewed in FIG. 1. The molten metal is heated by the cartridge electric heater 31 whereby the temperature drop of the molten metal can be prevented. When the electric heater 31 becomes faulty the cover plate 32 is removed for exchanging the faulty electric heater with a new one. Since the electric heater is disposed near the molten metal its heating efficiency is high. Moreover, the number of cartridge electric heaters can be decreased.

Figure 2:
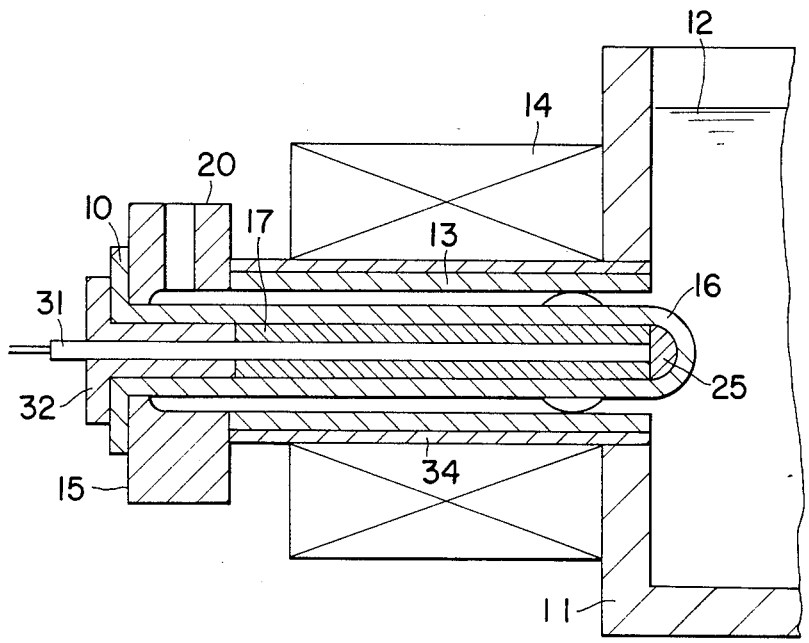
FIG. 2 is a similar sectional view showing a modified embodiment of this invention.

FIG. 2 shows another embodiment of this invention in which elements corresponding to those shown in FIG. 1 are designated by the same reference numerals. The embodiment shown in FIG. 2 is different from that shown in FIG. 1 in that the cartridge electric heater 31 is inserted in the opening of the magnetic core 17 over the entire length thereof, that a hemispherical fixture 25 is used for securing the magnetic core to the inner bottom of the inner conduit 16 and that a heat insulating member 34 is interposed between the exciting coil 14 and the outer conduit 13.

Since the embodiment shown in FIG. 2 has a construction similar to that of the first embodiment, it operates in the same manner with similar advantages.

Figure 3:
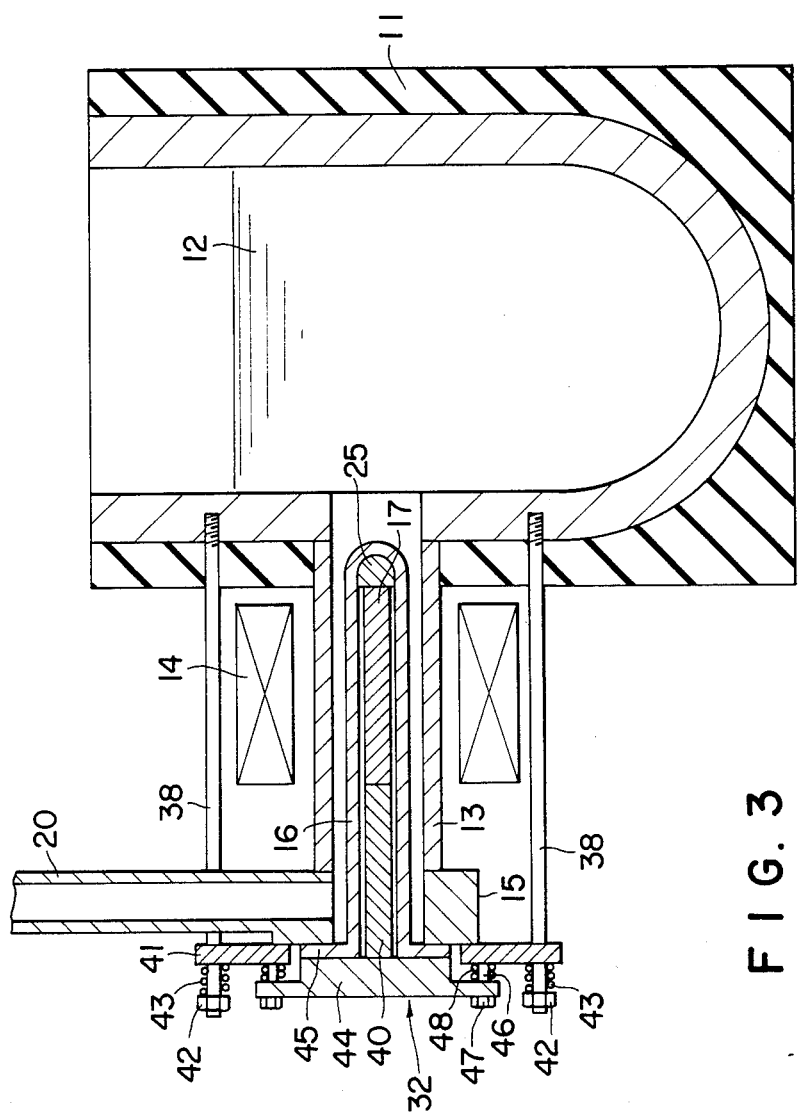
FIG. 3 is sectional view showing an electromagnetic pump having independent clamping means for the outer and inner conduits of the electromagnetic pump embodying the invention.

FIG. 3 shows a modification of the electromagnetic pump embodying the invention in which elements similar to those shown in FIGS. 1 and 2 are also designated by the same reference numerals. This modification is characterized in that the inner and outer conduits 16 and 13 are clamped by independent clamping means. More particularly, the magnetic core 17 is clamped between holder 25 and a clamping rod 40, whereas the outer conduit 13 is secured to the side surface of the molten metal vessel 11 via tie rods 38, a clamping plate 41 engaging the side surface of the coupling 15 and nuts 42 threaded on the outer ends of the tie rods 38 and compression srings respectively interposed between the clamping plate 41 and the nuts 42 to surround the tie rod 38. The inner conduit 16 is clamped by another clamping means including a clamping plate 32 urged against the flange 45 of the inner conduit 16, studs 46 secured to the outer surface of the clamping plate 41, nuts 47 threaded on the studs 46 and compression springs 48 respectively interposed between the clamping plates 41 and 44.

With this construction, since independent clamping means are provided for the outer and inner conduits respectively, exchange and inspection of the inner conduit can be made easily.

What is claimed is:

1. An electromagnetic pump comprising:
    an outer conduit with one end communicated with an interior of a vessel containing molten metal;
    an exciting coil surrounding said outer conduit;
    an inner conduit having a closed one end and concentrically disposed in said outer conduit for defining a passage for said molten metal between said inner and outer conduits;
    another conduit connected to the other end of said outer conduit through coupling means;
    a cartridge electric heater contained in said inner conduit for heating said molten metal flowing through said passage to said another conduit;
    a magnetic core contained in said inner conduit for passing magnetic flux created by said exciting coil; and
    a cover plate removably secured to the other end of said inner conduit for holding said cartridge electric heater and said magnetic core in said inner conduit.

2. The electromagnetic pump according to claim 1 wherein said cartridge electric heater and said magnetic core are disposed in series.

3. The electromagnetic pump according to claim 1 wherein said magnetic core takes the form of a hollow tube and said cartridge electric heater is inserted into said magnetic core.

4. The electromagnetic pump according to claim 2 which further comprises a split protective sleeve surrounding said cartridge electric heater.

5. The electromagnetic pump according to claim 4 wherein said split protective sleeve is made of a cobalt-vanadium alloy having a Curie point of about 880° C.

6. An electromagnetic pump comprising:
    an outer conduit having one end communicated with an interior of a vessel containing molten metal;
    an exciting coil surrounding said outer conduit;
    an inner conduit having a closed one end and concentrically disposed in said outer conduit for defining a passage for said molten metal between said inner and outer conduits;
    another conduit connected to the other end of said outer conduit through coupling means;
    a magnetic core contained in said inner conduit for passing magnetic flux created by said exciting coil; and
    a plurality of independnet clamping means for said inner and outer conduits respectively, said clamping means for said outer conduit comprising a first clamping plate resiliently urged against a side surface of said coupling means by tie rods extending through said first clamping plate and connected to a side surface of said vessel, and a second clamping plate resiliently supported by said frist clamping plate to be urged against an other end of said inner conduit, said second clamping plate being provided with means for holding said magnetic core in said inner conduit

* * * * *